US011353081B2

(12) United States Patent
Kranz et al.

(10) Patent No.: US 11,353,081 B2
(45) Date of Patent: Jun. 7, 2022

(54) ANYWHERE DAMPER

(71) Applicant: AFL Telecommunications LLC, Duncan, SC (US)

(72) Inventors: Steven Kranz, Moore, SC (US); Charles Monroe Price, III, Woodruff, SC (US); Morey Robert Samuel Agnew, Greer, SC (US)

(73) Assignee: AFL Telecommunications LLC, Duncan, SC (US)

(*) Notice: Subject to any disclaimer, the term of this patent is extended or adjusted under 35 U.S.C. 154(b) by 0 days.

(21) Appl. No.: 17/028,955

(22) Filed: Sep. 22, 2020

(65) Prior Publication Data

US 2021/0102594 A1 Apr. 8, 2021

Related U.S. Application Data

(60) Provisional application No. 62/912,367, filed on Oct. 8, 2019.

(51) Int. Cl.
*F16F 7/116* (2006.01)
*H02G 7/14* (2006.01)

(52) U.S. Cl.
CPC ........... *F16F 7/116* (2013.01); *F16F 2222/08* (2013.01); *F16F 2224/0208* (2013.01); *F16F 2230/0005* (2013.01); *H02G 7/14* (2013.01)

(58) Field of Classification Search
CPC ................... F16F 7/116; F16F 2222/08; F16F 2224/0208; F16F 2230/0005; H02G 7/14
See application file for complete search history.

(56) References Cited

U.S. PATENT DOCUMENTS

| 3,052,747 | A | | 9/1962 | Clark et al. |
| 3,941,914 | A | * | 3/1976 | Oishi ..................... H02G 7/14 174/42 |
| 4,011,397 | A | | 3/1977 | Bouche |
| 4,714,799 | A | | 12/1987 | Hawkins |
| 9,800,039 | B2 | | 10/2017 | Quesnel |
| 2004/0035601 | A1 | | 2/2004 | Dulhunty |
| 2013/0061466 | A1 | | 3/2013 | Casenhiser et al. |
| 2019/0229512 | A1 | * | 7/2019 | Crawford ................. F16F 7/10 |

FOREIGN PATENT DOCUMENTS

| CN | 206712413 U | * | 12/2017 |
| CN | 207150124 U | * | 3/2018 |
| CN | 109347037 A | * | 2/2019 |
| CN | 110277758 A | * | 9/2019 |

* cited by examiner

*Primary Examiner* — Melanie Torres Williams
(74) *Attorney, Agent, or Firm* — Dority & Manning, P.A.

(57) ABSTRACT

Stockbridge dampers are provided. A Stockbridge damper includes a first clamp, and a second clamp spaced along a longitudinal axis from the first clamp, wherein a distance is defined along the longitudinal axis between the first clamp and the second clamp. A Stockbridge damper further includes a wire strand extending generally along the longitudinal axis through and between the first clamp and the second clamp, the wire strand including a first end portion extending from a distal side of the first clamp, a second end portion extending from a distal side of the second clamp, and an intermediate portion extending between proximal sides of the first and second clamps. A Stockbridge damper further includes a first weight connected to the first end portion of the wire strand, and a second weight connected to the second end portion of the wire strand.

20 Claims, 1 Drawing Sheet

ANYWHERE DAMPER

PRIORITY CLAIM

The present application claims priority to U.S. Provisional Patent Application Ser. No. 62/912,367, filed on Oct. 8, 2019, the disclosure of which is incorporated by reference herein in its entirety.

FIELD

The present disclosure relates generally to Stockbridge dampers, and more particularly to improved Stockbridge dampers which may provide improved performance and/or ease of placement.

BACKGROUND

Aerial cable systems including but not limited to systems for the transmission/distribution of electricity, suspension bridge wires, and tower guy wires, are exposed to winds resulting in vibration in the conductor or non-conductor cable (collectively "cables"). This vibration can lead to damage of the cable itself or components that are attached to it. To mitigate this vibration, various forms of dampers can be used, with the most common being the Stockbridge damper (symmetrical or asymmetrical types). These dampers are placed at specific locations and spacing based on a variety of factors including cable tension and the expected wind exposure, and are specified to ensure proper protection coverage at the most likely range of vibration frequencies.

Vibration frequencies vary greatly and therefore a damper is placed at a specific location and spacing to provide the best coverage at the most likely range of frequencies. With this location/spacing requirement, there is potential for a damper to be placed on a node (point of no vibration) where the damper does not damp the cable and therefore provides no protection to the system. Additionally, when dampers are placed at a dead end assembly, at the end of armor rods at a suspension, or in the middle of a span, dampers must be placed as pairs to ensure at least one damper is providing protection if the other is placed on a node. The spacing between these damper pairs is specified to ensure that if one damper falls on a node at a certain frequency the other is not.

Due to the varying frequencies determined by certain variables (e.g. cable tension, cable diameter, terrain affecting the turbulence of the wind, attachment hardware, etc . . . ), software or hand calculations are required to determine the optimal placement of the damper in order to provide the best damping performance and therefore protection of the system. These analyses take time on the planning side.

Accordingly, improved dampers which facilitate a reduction in the amount of planning and calculations to determine spacing and placement are desired in the art. In particular, improved Stockbridge dampers which can be located in general areas rather than specific locations and which can still provide improved damping performance would be advantageous.

BRIEF DESCRIPTION

Aspects and advantages of the Stockbridge dampers in accordance with the present disclosure will be set forth in part in the following description, or may be obvious from the description, or may be learned through practice of the technology.

In accordance with one embodiment, a Stockbridge damper is provided. The Stockbridge damper includes a first clamp, and a second clamp spaced along a longitudinal axis from the first clamp, wherein a distance is defined along the longitudinal axis between the first clamp and the second clamp. The Stockbridge damper further includes a wire strand extending generally along the longitudinal axis through and between the first clamp and the second clamp, the wire strand including a first end portion extending from a distal side of the first clamp, a second end portion extending from a distal side of the second clamp, and an intermediate portion extending between proximal sides of the first and second clamps. The Stockbridge damper further includes a first weight connected to the first end portion of the wire strand, and a second weight connected to the second end portion of the wire strand.

In accordance with another embodiment, a Stockbridge damper is provided. The Stockbridge damper includes a first clamp, and a second clamp spaced along a longitudinal axis from the first clamp, wherein a distance is defined along the longitudinal axis between the first clamp and the second clamp, and wherein the distance is less than 48 inches. The Stockbridge damper further includes a wire strand extending generally along the longitudinal axis through and between the first clamp and the second clamp, the wire strand including a first end portion extending from a distal side of the first clamp, a second end portion extending from a distal side of the second clamp, and an intermediate portion extending between proximal sides of the first and second clamps. The Stockbridge damper further includes a first weight connected to a first end of the wire strand, and a second weight connected to a second end of the wire strand, wherein a length of the first end portion and a length of the second end portion are each less than a length of the intermediate portion.

These and other features, aspects and advantages of the present Stockbridge dampers will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present Stockbridge dampers, including the best mode of making and using the present systems and methods, directed to one of ordinary skill in the art, is set forth in the specification, which makes reference to the appended figures, in which.

DETAILED DESCRIPTION

Figure 1:
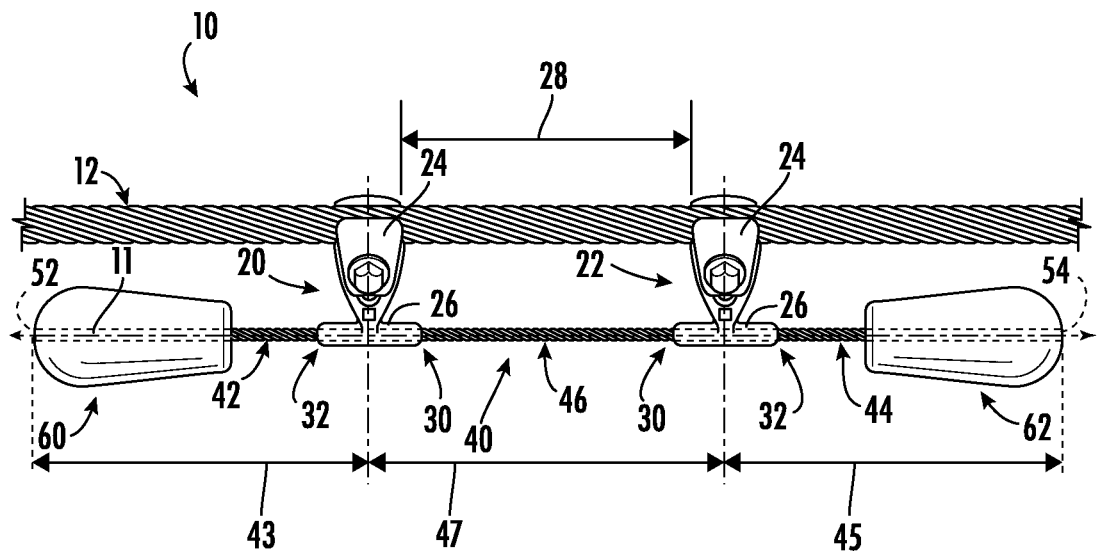
FIG. 1 is a front view of a Stockbridge damper connected to a cable in accordance with embodiments of the present disclosure.

Reference now will be made in detail to embodiments of the present Stockbridge dampers, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, terms of approximation, such as "generally" or "about", include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
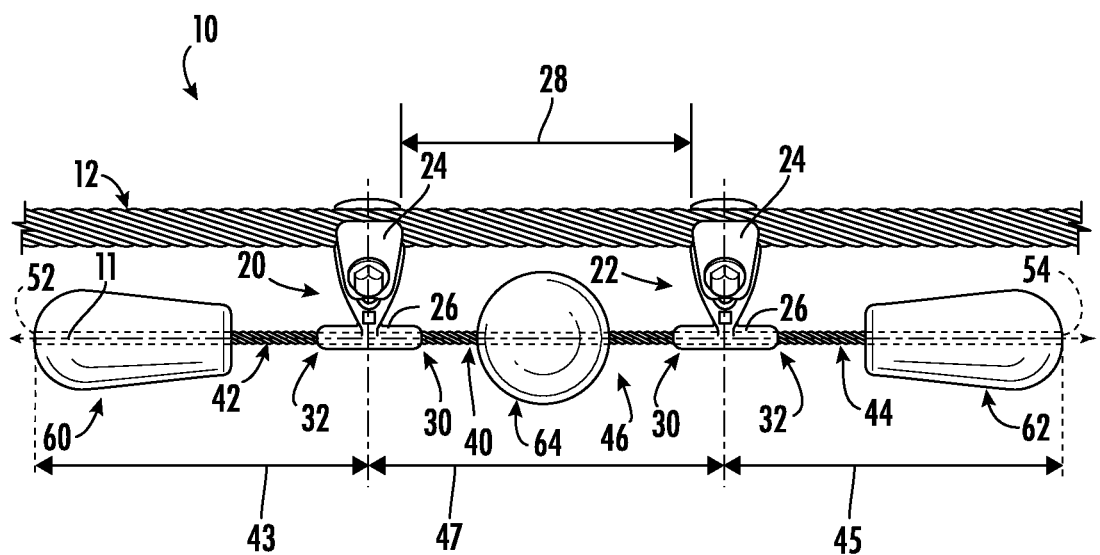
FIG. 2 is a front view of a Stockbridge damper connected to a cable in accordance with other embodiments of the present disclosure.

Referring now to FIGS. 1 and 2, the present disclosure is generally directed to improved Stockbridge dampers 10. Dampers 10 in accordance with the present disclosure advantageously facilitate a reduction in the amount of planning and calculations to determine spacing and placement on an associated cable 12. For example, Stockbridge dampers 10 in accordance with the present disclosure can advantageously be located in general areas rather than specific locations, and can still provide improved damping performance.

More specifically, Stockbridge dampers 10 in accordance with the present disclosure will, as discussed herein, advantageously have a second point of attachment/contact point to the cable 12 in order to cover a different point in the wave form of the vibration. This additional point of contact will translate that amplitudal motion of the cable 12 into the damper 10, allowing for the energy to be dissipated. In addition to such design providing better coverage, it will also reduce or eliminate the need for a damper recommendation study, which provides the recommended quantity and spacing of dampers on a cable. This reduces the engineering required on the front end of project planning for design/construction and provides a standardized application method where specific measurement/spacing is not required to be maintained and tracked per application of the dampers.

In a transmission construction environment the previously required spacing can vary anywhere from 12" to 60" from a deadend, suspension, or other component connected to a cable, and therefore the line crews must know the structure that they are performing the installation on in order to get that span's specific spacing. This can lead to improper installation and requirement for post installation audit and inspection. The improved damper 10 design in accordance with the present disclosure reduces or eliminates the need to know specific spacing, and thus offers improved performance and time savings in project planning and project construction.

As shown, a Stockbridge damper 10 in accordance with the present disclosure includes a first clamp 20 and a second clamp 22. The first and second clamps 20, 22 may be spaced apart along a longitudinal axis 11 of the damper 10, such that the second clamp 22 is spaced along the longitudinal axis 11 from the first clamp 20. Each clamp 20, 22 may include a cable clamp portion 24 which connects to a cable 12 and a damping portion 26 which is connected to other components of the damper 10 as discussed herein. The damping portion 26 of each clamp 20, 22 may be below the cable clamp portion 24, such as along an axis that is transverse to the longitudinal axis 11.

Each clamp 20, 22 may further have a proximal side 30 and a distal side 32. The proximal sides 30 are the sides closest to and facing each other, while the distal sides 32 are the opposing sides from the proximal sides 30 and which are farthest from and facing away from each other.

A distance 28 may be defined between the first clamp 20 and the second clamp 22. The distance 28 may be defined along the longitudinal axis 11. The distance 28 may be measured to and between the proximal sides 30. In some exemplary embodiments, the distance is less than 48 inches. Further, in some exemplary embodiments, the distance is between 8 inches and 48 inches, such as between 10 inches and 28 inches, such as between 12 inches and 26 inches, such as between 12 inches and 24 inches, such as between 16 inches and 26 inches, such as between 18 inches and 24 inches.

When the damper 10 is connected to a cable 12, the cable 12 is connected to both the first clamp 20 and the second clamp 22, such as to the cable clamp portions 24 thereof. The cable 12 may thus generally extend through and between the clamps 20, 22, such as generally along the longitudinal axis 11. The use of both first clamp 20 and second clamp 22 advantageously provides two connection points for the damper 10, thus advantageously providing cable damping while not requiring the damper 10 to be connected at a specific location, as discussed herein. The exemplary distances between the first clamp 20 and second clamp 22 further facilitate such advantages while also allowing installation by a single worker at a single location along a cable 12.

In exemplary embodiments, the clamps 20, 22 may be formed from a metal, such as in exemplary embodiments aluminum.

A Stockbridge damper 10 in accordance with the present disclosure may further include a wire strand 40. Wire strand 40 may extend generally along the longitudinal axis 11 through and between the first clamp 20 and second clamp 22, such as through and between the damping portions 26 thereof. In exemplary embodiments, wire strand 40 is a single, unitary component. Alternatively, however, wire strand 40 may be formed from multiple wire sections.

Wire strand 40 may include a first end portion 42, a second end portion 44, and an intermediate portion 46. First end portion 42 may extend from the distal side 32 of the first clamp 20, such as generally along the longitudinal axis 11. Second end portion 44 may extend from the distal side 32 of the second clamp 22, such as generally along the longitudinal axis 11. Intermediate portion 46 may extend between the proximal sides 30 of the first and second clamps 20, 22, such as generally along the longitudinal axis 11.

In exemplary embodiments, a length 43 of the first end portion 42 and a length 45 of the second end portion 44 may be generally equal. Alternatively, the length 43 of the first end portion 42 may be less than or greater than the length 45 of the second end portion 44. Additionally or alternatively, in exemplary embodiments, a length 43 of the first end portion 42 and a length 45 of the second end portion 44 may each be less than, generally equal to, or greater than a length 47 of the intermediate portion 46. Length 43 may be measured from a first end 52 of the wire strand 40 to the center of the damping portion 26 of the first clamp 20. Length 45 may be measured from a second end 54 of the wire strand 40 to the center of the damping portion 26 of the second clamp 22. Length 47 may be measured from the center of the damping portion 26 of the first clamp 20 to the center of the damping portion 26 of the second clamp 22.

In exemplary embodiments, wire strand 40 may be formed from a metal, such as in exemplary embodiments steel (e.g. galvanized steel).

A Stockbridge damper 10 further includes a first weight 60 and a second weight 62. First weight 60 may be connected to the first end portion 42 of the wire strand 40, and a second weight 62 may be connected to the second end portion 44 of the wire strand 40. In exemplary embodiments, first weight 60 may be connected to the first end 52. Further, in exemplary embodiments, second weight 62 may be connected to the second end 54.

In exemplary embodiments, the first weight 60 and second weight 62 may have generally the same mass. Further, in some embodiments, the first weight 60 and second weight 62 may be generally identical, and thus have the same shape, size, and mass. Alternatively, the first weight 60 and second weight 62 may have different masses, and thus be asymmetric. Additionally or alternatively, the first weight 60 and second weight 62 may be non-identical, and thus have a different shape, size, and/or mass from each other.

Referring now specifically to FIG. 2, in exemplary embodiments a Stockbridge damper 10 in accordance with the present disclosure includes a third weight 64. Third weight 64 may be connected to the intermediate portion 46 of the wire strand 40. In exemplary embodiments, third weight 64 may be located at one or more of a centerpoint of the wire strand 40 along the longitudinal axis 11, a middle of the distance 28 between the first clamp 20 and the second clamp 22, or a centerpoint of the intermediate portion 46.

In exemplary embodiments, a mass of the third weight 64 may be less than the mass of the first weight 62 and may be less than the mass of the second weight 64.

In exemplary embodiments, weights 60, 62, 64 may be formed from a metal such as in exemplary embodiments iron (e.g. cast iron).

First weight 60 and second weight 62 generally activate the wire strand 40, and more specifically the first end portion 42 and second end portion 44 thereof, to provide damping during use of the damper 10. Further, the present inventors have discovered that, in addition to the advantages with respect to ease of locating, the use of a second clamp 22 and the resulting intermediate portion 46 advantageously provide improved damping. Specifically, during use, the intermediate portion 46 is also activated to provide damping. Still further, the present inventors have discovered that the use of a third weight 64 is particularly advantageous, as such third weight 64 further activates the wire strand 40, and in particular the intermediate portion 46 thereof, to provide damping during use of the damper 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A Stockbridge damper, comprising:
a first clamp;
a second clamp spaced along a longitudinal axis from the first clamp, wherein a distance is defined along the longitudinal axis between the first clamp and the second clamp;
a wire strand extending generally along the longitudinal axis through and between the first clamp and the second clamp, the wire strand comprising a first end portion extending from a distal side of the first clamp, a second end portion extending from a distal side of the second clamp, and an intermediate portion extending between proximal sides of the first and second clamps;
a first weight connected to the first end portion of the wire strand;
a second weight connected to the second end portion of the wire strand; and
a third weight, the third weight connected to the intermediate portion of the wire strand.

2. The Stockbridge damper of claim 1, wherein the distance is less than 48 inches.

3. The Stockbridge damper of claim 1, wherein the distance is between 10 inches and 28 inches.

4. The Stockbridge damper of claim 1, wherein the distance is between 16 inches and 26 inches.

5. The Stockbridge damper of claim 1, wherein the wire strand is formed from steel.

6. The Stockbridge damper of claim 1, wherein the first weight and the second weight are generally identical.

7. The Stockbridge damper of claim 1, wherein the first weight and the second weight have generally the same mass.

8. The Stockbridge damper of claim 1, wherein the first weight is connected to a first end of the wire strand and the second weight is connected to a second end of the wire strand.

9. The Stockbridge damper of claim 1, wherein a length of the first end portion and a length of the second end portion are generally equal.

10. The Stockbridge damper of claim 1, wherein a length of the first end portion and a length of the second end portion are each less than a length of the intermediate portion.

11. The Stockbridge damper of claim 1, wherein a mass of the third weight is less than the mass of the first weight and the mass of the second weight.

12. The Stockbridge damper of claim 1, wherein the third weight is located at a centerpoint of the wire strand along the longitudinal axis.

13. The Stockbridge damper of claim 1, wherein the third weight is located at the middle of the distance along the longitudinal axis.

14. A Stockbridge damper, comprising:
a first clamp;
a second clamp spaced along a longitudinal axis from the first clamp, wherein a distance is defined along the longitudinal axis between the first clamp and the second clamp, and wherein the distance is less than 48 inches;
a wire strand extending generally along the longitudinal axis through and between the first clamp and the second clamp, the wire strand comprising a first end portion extending from a distal side of the first clamp, a second end portion extending from a distal side of the second clamp, and an intermediate portion extending between proximal sides of the first and second clamps;
a first weight connected to a first end of the wire strand; and
a second weight connected to a second end of the wire strand, wherein a length of the first end portion and a length of the second end portion are each less than a length of the intermediate portion.

15. The Stockbridge damper of claim 14, wherein the first weight and the second weight are generally identical.

16. The Stockbridge damper of claim 14, wherein the first weight and the second weight have generally the same mass.

17. The Stockbridge damper of claim 14, wherein a length of the first end portion and a length of the second end portion are generally equal.

18. The Stockbridge damper of claim 14, further comprising a third weight, the third weight connected to the intermediate portion of the wire strand.

19. The Stockbridge damper of claim 18, wherein a mass of the third weight is less than the mass of the first weight and the mass of the second weight.

20. A Stockbridge damper, comprising:
a first clamp;
a second clamp spaced along a longitudinal axis from the first clamp, wherein a distance is defined along the longitudinal axis between the first clamp and the second clamp;
a wire strand extending generally along the longitudinal axis through and between the first clamp and the second clamp, the wire strand comprising a first end portion extending from a distal side of the first clamp, a second end portion extending from a distal side of the second clamp, and an intermediate portion extending between proximal sides of the first and second clamps;
a first weight connected to the first end portion of the wire strand; and
a second weight connected to the second end portion of the wire strand;
wherein a length of the first end portion and a length of the second end portion are each less than a length of the intermediate portion.

* * * * *